3,373,177
PREPARATION OF METAL CHELATES OF
β-IMINOCARBONYLS
Donald C. Young, Fullerton, Calif., assignor to Union
Oil Company of California, Los Angeles, Calif., a corporation of California
No Drawing. Filed May 20, 1963, Ser. No. 281,757
3 Claims. (Cl. 260—429)

This invention relates to metal complexes of β-iminoketones and to a method for their preparation.

Specifically, this invention relates to the metal complexes of organic ligands having the following structure:

which exist in tautomerism with the following:

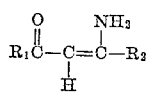

wherein $R_1$ and $R_2$ are selected from the class consisting fo hydrogen, e.g., iminoaldehydes and alkyl groups having from 1 to about 5 carbons such as methyl, ethyl, isopropyl, propyl, butyl, isobutyl amyl, isoamyl, etc. Preferably both $R_1$ and $R_2$ are alkyl. The imino form is the active form of the ligand and examples of suitable ligands are as follows: 1-methyl 3-iminopropanone, 1-ethyl 3-iminopropanone, 1-isopropyl 3-iminopropanone, 3-isopropyl 3-iminopropanone, 1,3-diisopropyl 3-iminopropanone, 1-propyl 3-iminopropanone, 3-propyl 3-iminopropanone, 1,3-dipropyl 3-iminopropanone, 1-isobutyl 3-iminopropanone, 3-butyl 3-iminopropanone, 1,3-dibutyl 3-iminopropanone, 1-amyl 3-iminopropanone, 3-isoamyl 3-iminopropanone, 1,3-diisoamyl 3-iminopropanone, etc.

In general, the aforementioned organic compounds function as bidentate and as tridentate ligands with many metal ions; the centers of metal ion attraction being the imino nitrogen, the carbonyl oxygen and the unsaturate bond. The resulting metal chelates are very stable since the existence of an unsaturated bond in the chelate ring imparts a resonance stability to the chelate.

The ligands previously described, or rather, their tautomers can be readily prepared from the corresponding diketenone by reacting the diketenone with ammonia in a nonaqueous reaction medium at temperatures between about 0° and about 100° C. and sufficient pressure to maintain liquid phase reaction conditions. The diketenone is, of course, in desmotropism with the enol form and this form reacts with ammonia. The reaction proceeds in two stages; in the first reaction, the ammonium salt of the enol compound is formed which upon further heating decomposes to form the amino-ketenone compound and water. The organic phase, containing the desired product, is thereafter separated from the aqueous phase and then distilled to recover the product.

Preferably, ambient temperatures are employed in the first step for the preparation of the ammonium salt of the enol form of the diketenone, e.g., temperatures between about 15° and about 65° C., most preferably between about 20° and about 50° C. and a pressure sufficient to maintain liquid conditions, generally between about atmospheric and about 10 atmospheres, preferably between about atmospheric and about 5 atmospheres. The ammonium enol salt is readily formed under these conditions, generally within about 5 to about 30 minutes and, thereafter, the reaction medium is heated to a temperature between about 50° and about 150° C., preferably between about 60° and about 80° C. to obtain the aminoketenone compound.

Because the aminoketenone will readily hydrolyze to the diketenone, it is important to promptly separate the organic phase from the aqueous phase formed during the latter heating step. After the phases have been separated, then the organic phase can be worked up in a conventional manner, e.g., fractionation to purify the aminoketenone compound of the non-aqueous reaction medium.

Various organic solvents can be employed as the reaction medium including hydrocarbons such as toluene, xylene, benzene, hexane, heptane, octane, etc.; alkanols such as allyl alcohol, butyl alcohol, amyl alcohol, hexanol, heptanol, decanol, etc.; esters such as ethyl propionate, propyl acetate, butyl formate, butyl acetate, ethyl butyrate, amyl acetate, amyl butyrate, etc.; halogenated hydrocarbons such as dichloropropane, trichloroethane, chlorobenzene, bromobenzene, trichloropropane, pentachloroethane, dichlorobenzene, etc.; carboxylic acids such as acetic acid, butyric acid, pentanoic acid, toluic acid, terephthalic acid, isophthalic acid, trimellitic acid, etc.

The unsaturated beta-diketone compounds that are employed as the starting materials in the aforedescribed reaction can, in most instances, be obtained commercially. The preparation of these materials, however, is relatively simple and comprises reacting an olefin with a diketene in the presence of a suitable acylation catalyst. This method of preparation is described in U.S. Patent 2,453,619. As an example, about one mol of diketene and one mole of diisobutylene can be mixed and about one-half mol of commercial 95 percent sulfuric acid added dropwise to the mixture while stirring and maintaining the temperature below about 100° F. After allowing about an hour to complete the reaction, about 500 ml. of water can be added to dissolve the catalyst. The organic layer can then be separated from the aqueous layer and the diketone recovered therefrom by a suitable procedure. Preferably the organic layer is washed with water and treated with dilute sodium carbonate to remove traces of acid and then distilled under vacuum to obtain the diketone. The diketone is thereafter treated with ammonia in a non-aqueous medium in the manner previously described to obtain the iminoketone ligand employed to prepare the metal chelates of my invention.

The metal complexes of the aminoalkenones that comprise my invention are prepared by reacting the ligand, i.e., β-iminoketone, with an ammoniacal solution of the metal. In general, any metal that forms ammine complexes in ammoniacal solutions will readily form a complex with the ligand according to my invention.

The chemistry of metal ammine salts and their formation is a well documented field, i.e., see volume X of "A Textbook of Inorganic Chemistry" edited by J. Newton Friend (1928). In general, the transition metals that readily form stable ammine complexes in aqueous ammoniacal solutions can be employed to form the complex with the ligand of my invention. Generally, included are the following metals and their known ammino complexes:

Copper: pentammino, tetrammino, diammino and monammino cupric halides, nitrates and sulfates;

Silver: triammino, sesquiammino, diammino and monammino silver halides and nitrates;

Gold: dodecammino, triammino, diammino and monammino-aurous halides and nitrates;

Zinc: hexammino, tetrammino, diammino and monammino zinc halides, nitrates and sulfates;

Cadmium: hexammino, tetrammino, triammino, diammino and monammino cadmium halides, nitrates and sulfates;

Mercury: triammino-dimercuric, dodecammino, tetrammino, triammino, diammino and monammino mercuric halides;

Tin: diammino, monoammino and octammino stannic halides, diammino-stannous halides;

Lead: tetrammino, diammino and monammino lead halides;

Bismuth: triammino bismuth halides;

Chromium: hexammino, aquo-pentammino, diaquotetrammino, triaquo-triammino, tetraquodiammino, hydroxo-pentammino, hydroxoaquotetrammino, hydroxodiaquotriammino, hydroxotriaquo-diammino, acidopentammino, acidoaquotetrammino, dihydroxy-diaquo-diammino, diacido - tetrammino - diacido-aquotriammino, diacido-diaquodiammino, triacido-triammino, trihydroxo-aquo-diammino chromium halides, nitrates and sulfates;

Molybdenum: monammino molybdenum and decammino dimolybdenum halides;

Manganese: ammino-manganous halides, nitrates and sulfates;

Iron: hexammino, pentammino, diammino and monammino ferrous halides and sulfates;

Cobalt: hexammino, hexahydroxyammino, aquopentammino, diaquo-tetrammino, triaquo-triammino, hydroxopentammino, hydroxo-aquo-tetrammino, acidopentammino, acido-aquo-tetrammino, acido-diaquo-triammino, acido-triaquo-diammino, hydroxo-acido-tetrammino, diacido - tetrammino, diacido - aquo - triammino, diacido-diaquo-diammino cobaltic halides, nitrates and sulfates;

Nickel: diammino, triammino, tetrammino, hexammino and pentammino nickel halides, nitrates and sulfates.

Ruthenium: heptammino-diruthenium halides;

Rhodium: hexammino rhodium halides, nitrates;

Palladium: diammino tetrammino palladous halides;

Osmium: diammino, tetrammino osmium halides, nitrates and sulfates;

Iridium: diammino, tetrammino, hexammino, aquopentammino, acido-pentammino, hydroxy-pentammino, diacido-tetrammino, triacido-triammino iridium halides, nitrates, sulfates; and Platinum: tetrammino, acido-triammino, diacido-diammino, triacido-ammino platinous halides, nitrates and sulfates, hexammino, acido - pentammino, diacido-tetrammino, triacido-triammino, tetracido-diammino pentacido-ammino platinic halides, nitrates and sulfates.

The preceding listing does not exclusively list all useful metal ammine complexes, but rather is set forth to illustrate representative metals and their ammine complexes that can be used in my invention. Various other metals, known to form ammine complexes, can also be used such as those known to form ammine complexes in alkaline solutions from the lanthanum series, including cerium, praseodymium, neodymium, promethium, samarium, europium, gadolinium, terbium, dysprosium, holmium, erbium, thulium, ytterbium and eutetium, as well as from the actinium series, i.e., thorium, protactinium, uranium, neptunium, plutonium, americium, curium, berkelium, californium, einsteinium, ferminium and mendelvium.

In general, the ammonia content of the aqueous ammoniacal solution employed to obtain the ammine complex can be between about 5 and about 50 weight percent, preferably between about 15 and about 25 weight percent. Sufficient of the metal salt is added to obtain a concentration of the metal in the solution between about 1 and about 10 weight percent. These ammoniacal solutions of the metal ammine complex can be prepared at ambient or slightly elevated temperatures as desired to effect the solubility. In general, temperatures between about 20° and about 100° C. at atmospheric or slightly elevated temperatures, up to about 10 atmospheres, can be employed as desired. Preferably, the preparation of the solution is at ambient conditions, between about 20° and about 35° C.

The complex of the metal ion and the iminoketone ligand can be obtained simply by dissolving the ligand in the aforedescribed ammoniacal metal ammine salt solution. In general, ambient temperatures are also employed in this step, between about 5° and about 50° C.; between about 20° and about 25° C. being preferred. Again, to prevent substantial loss of ammonia during this step, slightly elevated pressures can be maintained when the mixing is performed at temperatures above about 25° C. or when using solutions with high ammonia contents to avoid loss of ammonia, e.g., pressures between about atmospheric and about 10 atmospheres.

The metal complex precipitates, in most instances, from the ammoniacal solution as a crystalline solid and can be recovered therefrom by conventional solid-liquid separating techniques, e.g., by filtering, centrifuging, etc. To avoid the presence of two solids, it is preferred to add the ligand to the ammoniacal solution as an aqueous solution. In instances where the metal iminoketone complex is quite soluble in water, e.g., the cupric iminoketone complex, it can be precipitated therefrom by the addition of an agent which lowers it's solubility, e.g., acetone, acetic acid, etc. Also, if desired, the metal iminoketone complex can be prepared by admixing stoichiometric quantities of the metal ammine complex and the iminoketone ligand and thereafter evaporating the aqueous solution. Preferably, however, the metal iminoketone complex is simply recovered as a solid precipitate from the ammoniacal solution.

If desired, other methods for the preparation of the metal complex can be employed provided that the presence of water is excluded in their preparation. To illustrate, the metal complex can be obtained by dissolving a soluble salt of any of the aforedescribed metals in a polar organic solvent such as an alcohol, or carboxylic acid. Thus, an alcoholic solution, e.g., methanol, ethanol, propanol, isopropanol, butanol, isobutanol, amyl alcohol, isoamyl alcohol, etc., can be employed to dissolve a soluble salt such as a halide, chloride, fluoride, iodide, bromide, or sulfate, nitrate, acetate, of any of the aforedescribed metals. To the alcoholic solution is thereafter added the solid organic ligand or an alcoholic solution of the ligand. The aforedescribed metals can also be dissolved in carboxylic acids such as acetic, propionoic, butypric, pentanoic, toluic, etc. and reacted in such solution with the organic ligand. As with the preparation in the ammonical solution, the metal complexes separate as precipitates in either the alcoholic or carboxylic acid reaction mediums. This precipitate can be readily separated therefrom by conventional solid-liquid separation steps previously described.

The metal complexes of my invention can be employed for a variety of uses as fungicides and pesticides, particularly with those metals having known toxic effect such as copper, mercury, beryllium, silver, etc. The complexes can also be employed as catalysts for various reactions, e.g., the titanium complex can be employed as a polymerization catalyst, the zirconium complex as a condensation catalyst, and, in particular, the noble Group VIII metal complexes can be employed as hydrocarbon oxidation catalysts. Additionally, complexes of any of the following metals aforedescribed can be employed as sources of minor nutrients for agricultural purposes:

For use as fungicides and pesticides, the metal complex can be formulated into a wettable powder by grinding together and intimately admixing the following ingredients:

| | Percent by weight |
|---|---|
| Metal complex | 10.0 |
| Attapulgus clay | 30.0 |
| Ligand sulfate suspending agent | 1.0 |
| Alkyl sulfonate wetting agent | 1.0 |
| "Dupanol" | 1.0 |
| Water | Balance |

This composition is dispersed in water with the aid of a high speed blender to obtain a spray composition of the desired concentration.

Various metal complexes of my invention can also be used as catalysts for particular reactions such as the oxidation of olefins to valuable carbonyl compounds such as epoxides, aldehydes, ketones, unsaturated esters, etc., by use of the noble metal complexes aforedescribed in substantially anhydrous reaction mediums. To illustrate, ethylene can be oxidized to a high yield of carbonyls by reacting ethylene with oxygen at a temperature between about 100° and about 200° C. in a substantially anhydrous organic solution of the palladium complex. Similarly, propylene and butene can be oxidized to yield, respectively, acetone, propionaldehyde, methyl ethyl ketone and butyraldehyde. Slight amounts of epoxides can also be obtained in this oxidation.

My invention will now be illustrated by the following exemplified descriptions:

*Example 1*

To a two-liter flask was added 1000 grams toluene and 500 grams of commercially obtained 2,4-pentanedione. Anhydrous ammonia was slowly added while stirring to maintain the temperature below about 50° C. The flask contents were then permitted to cool to room temperature, transferred to a separatory funnel and an aqueous phase comprising 73 grams of water was removed. The organic phase was transferred to a distillation flask and distilled to recover about 400 grams of product boiling from 206° to 215° C. Subsequent distillation of the product permitted recovery of the aminoketenone in pure state, atmospheric boiling points 209° C. The product is a deliquescent crystalline solid with a melting point of about 42° C. It is soluble in polar solvents such as water and acetone and aromatic solvents, but insoluble in normal paraffins.

*Example 2*

Metal amine complexes were prepared by dissolving the following salts in an aqua ammonia of 10 percent strength ammonia:

Nickel chloride, cupric chloride, cobaltous chloride, cerous chloride and palladium chloride.

To each of the ammoniacal solutions of the metal ammine salts was added a portion of the crystalline solid prepared in Example 1. The mixtures were warmed gradually until a color change was observed. The nickel iminoketone complex was formed and separated as a water insoluble red-orange solid. The copper iminoketone complex formed as a blue-gray water insoluble solid and the cobalt iminoketone complex formed as a water insoluble red solid. The cerous iminoketone formed as a water insoluble gray to lavender colored solid and the palladium iminoketone complex formed as a water insoluble yellow solid.

The preceding examples are intended only to illustrate the mode of practicing my invention and are not intended to be unduly limiting thereof. It is apparent from the preceding discussion that the method of forming stable complexes of metal ions and β-iminoketones can be readily applied to all metals that form stable ammine salts in ammoniacal solutions as this condition of the metal ion is generally required in preparation of the complex in aqueous media.

I claim:

1. The preparation of a metal chelate salt from a transition metal that forms ammine salts in aqueous ammoniacal solutions and a ligand having the following structure:

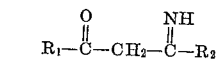

wherein $R_1$ and $R_2$ are selected from the class consisting of hydrogen and alkyl groups having 1 to about 5 carbons; said method comprising forming the ammine salt of said metal in an aqueous ammoniacal solution and thereafter admixing said ligand with said solution containing from about 5 to 50 percent ammonia at a temperature between about 5° and about 50° C. to form said complex as a solid precipitate.

2. The preparation of claim 1 wherein $R_1$ and $R_2$ are each alkyl and have 1 to about 3 carbons.

3. The preparation of claim 2 wherein said ligand is 1,3-dimethyl 3-iminopropanone.

References Cited

UNITED STATES PATENTS

| | | |
|---|---|---|
| 2,465,296 | 3/1949 | Swiss. |
| 2,278,965 | 4/1942 | Peski et al. |

OTHER REFERENCES

"Chemical Abstracts"—vol. 57, 1962, p. 367.

TOBIAS E. LEVOW, *Primary Examiner.*

H. M. S. SNEED, *Assistant Examiner.*

UNITED STATES PATENT OFFICE
CERTIFICATE OF CORRECTION

Patent No. 3,373,177                          March 12, 1968

Donald C. Young

It is certified that error appears in the above identified patent and that said Letters Patent are hereby corrected as shown below:

Column 6, line 28, after "solution" insert -- containing from about 5 to 50 percent ammonia --; lines 29 and 30, strike out "containing from about 5 to 50 percent ammonia".

Signed and sealed this 24th day of June 1969.

(SEAL)
Attest:

Edward M. Fletcher, Jr.                      WILLIAM E. SCHUYLER, JR.
Attesting Officer                              Commissioner of Patents